United States Patent
Masaki

(10) Patent No.: US 9,331,870 B2
(45) Date of Patent: May 3, 2016

(54) SWITCH, INFORMATION PROCESSING APPARATUS, AND INFORMATION PROCESSING SYSTEM

(75) Inventor: Atsushi Masaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1079 days.

(21) Appl. No.: 13/334,122

(22) Filed: Dec. 22, 2011

(65) Prior Publication Data

US 2012/0218993 A1    Aug. 30, 2012

(30) Foreign Application Priority Data

Feb. 28, 2011  (JP) ................................ 2011-042856

(51) Int. Cl.
*H04L 12/54* (2013.01)
*H04L 12/931* (2013.01)

(52) U.S. Cl.
CPC .......... *H04L 12/5696* (2013.01); *H04L 49/356* (2013.01); *H04L 49/357* (2013.01); *H04L 12/56* (2013.01); *H04L 49/00* (2013.01); *H04L 49/35* (2013.01); *H04L 49/351* (2013.01)

(58) Field of Classification Search
None
See application file for complete search history.

(56) References Cited

U.S. PATENT DOCUMENTS

| 5,107,489 A * | 4/1992 | Brown et al. ................. 370/360 |
| 8,144,574 B1 * | 3/2012 | Hu et al. ....................... 370/218 |
| 2005/0108444 A1 * | 5/2005 | Flauaus et al. .................. 710/15 |

FOREIGN PATENT DOCUMENTS

| EP | 2071469 A1 | 6/2009 |
| JP | 2005-92322 A | 4/2005 |
| JP | 2010-193032 A | 9/2010 |
| WO | WO-2008/075425 A1 | 6/2008 |

OTHER PUBLICATIONS

Japanese Office Action mailed Jun. 24, 2014 for corresponding Japanese Patent Application 2011-042856, with Partial English Translation, 6 pages.

* cited by examiner

*Primary Examiner* — Jae Y Lee
*Assistant Examiner* — Aixa guadalupe-Cruz
(74) *Attorney, Agent, or Firm* — Fujitsu Patent Center

(57) ABSTRACT

A switch receives a state change notice from a server via a port, the state change notice indicating that the state is changed. When a port receives a state change notice, the switch shifts the state of the port to a waiting-for-driver-start-up state to prevent execution of a process that corresponds to a signal that is received from the server. When the port receives, after it is shifted to the waiting-for-driver-start-up state, a signal that satisfies a predetermined condition from the server, the switch releases the port from the waiting-for-driver-start-up state.

9 Claims, 8 Drawing Sheets

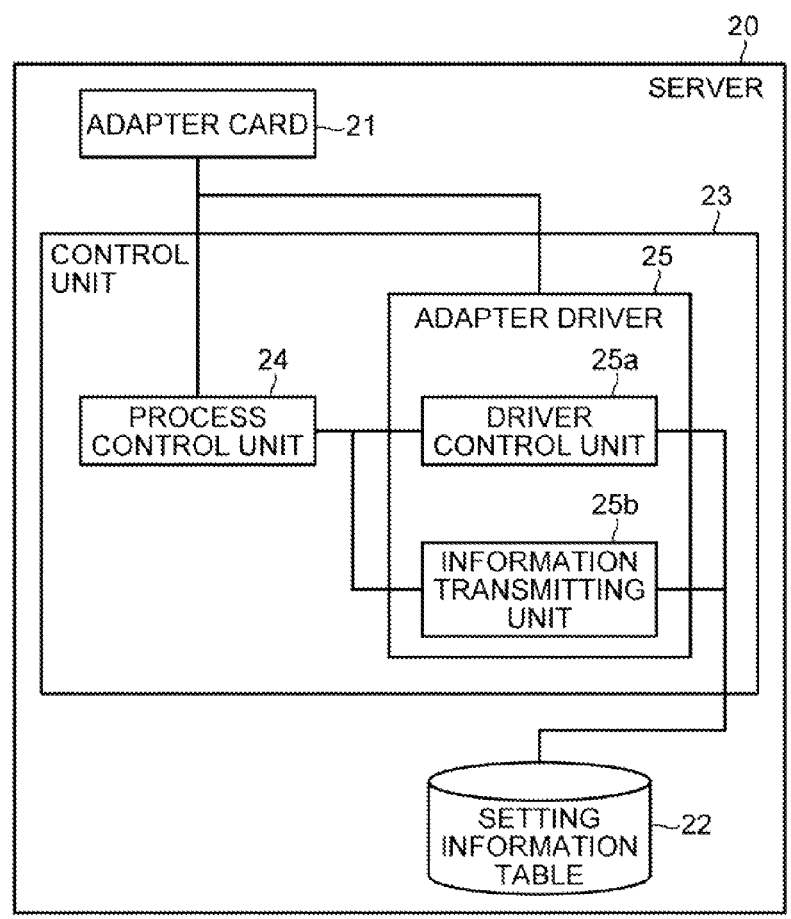

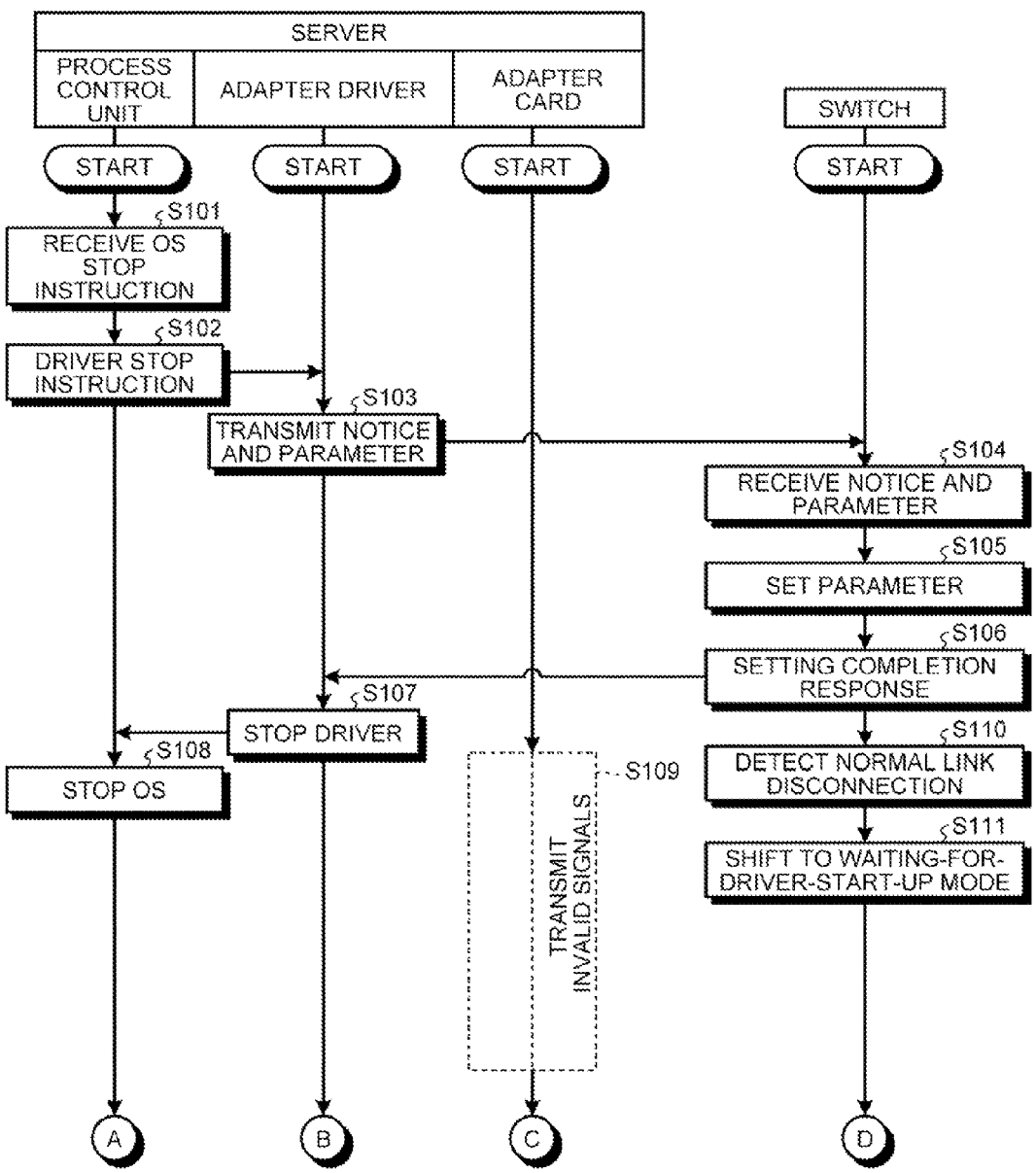

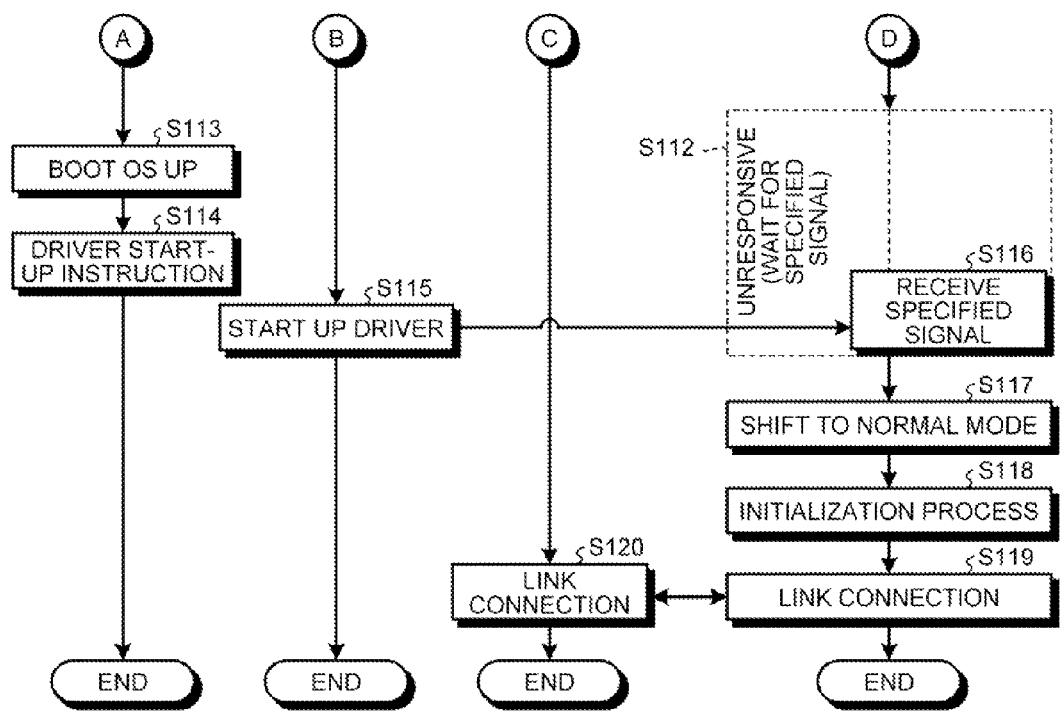

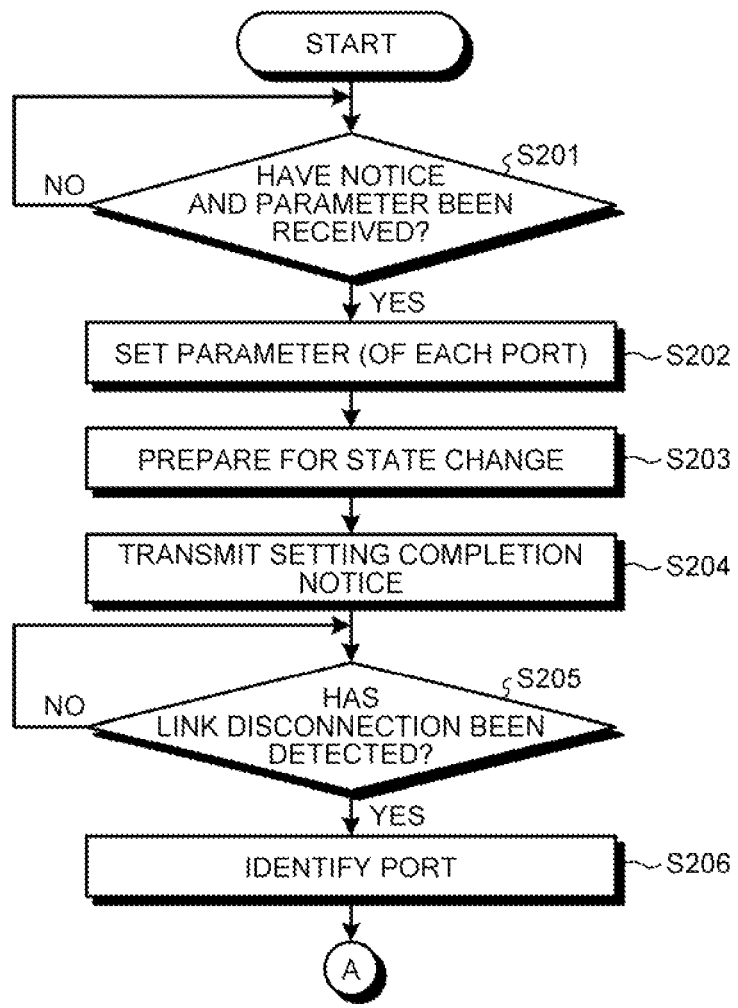

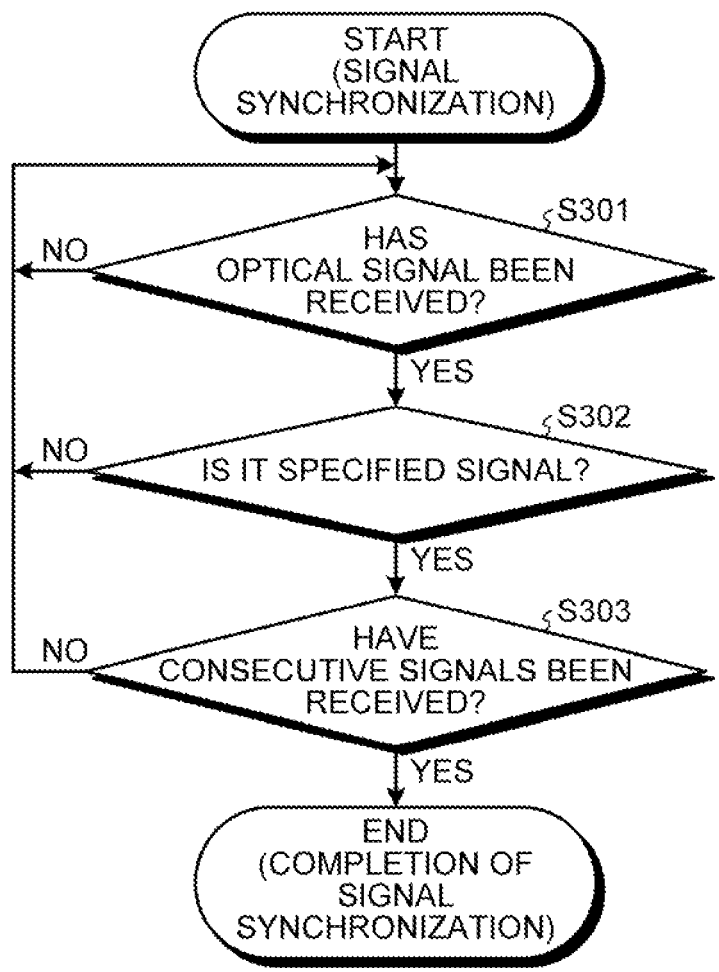

SWITCH, INFORMATION PROCESSING APPARATUS, AND INFORMATION PROCESSING SYSTEM

CROSS-REFERENCE TO RELATED APPLICATION

This application is based upon and claims the benefit of priority of the prior Japanese Patent Application No. 2011-042856, filed on Feb. 28, 2011, the entire contents of which are incorporated herein by reference.

FIELD

The embodiments discussed herein are directed to a switch, an information processing apparatus, and an information processing system.

BACKGROUND

Recently, as represented by cloud computing, a system configuration has been widely used in which a plurality of servers and a plurality of storage devices are installed at a data center and various services are provided to clients. In such a system configuration, an FC switch (fibre channel switch) that achieves high-speed communications is used to connect a plurality of servers to a plurality of storages.

A modern FC switch has a function whereby it stops the operation of a port temporarily when the port receives a predetermined number of invalid signals. This function prevents the FC switch from recursively repeating a link initialization process or linkup that is executed automatically after a link down is detected, thereby preventing a perpetual resource shortage.

More particularly, even when the operating system (OS) is shut down, if power is supplied to a server or storage device, the server or storage device may continue issuing optical signals to a switch. Because the driver is stopped but the adapter is not stopped, the adapter continues issuing optical signals to the switch. The issued optical signals are, because of a feature of the protocol, invalid signals having a meaningless value. As long as the switch is receiving invalid signals, the switch repeats processes to check the synchronization between signals, processes to tune the transmission rate, etc; therefore, a perpetual resource shortage occurs in the CPU (Central Processing Unit). The abovementioned function of temporarily stopping the port is used as a means of preventing such resource shortages.

Patent document 1: International Publication Pamphlet No. WO 2008/075425

A problem with the conventional technology is that the link initialization process is not stable. This problem occurs with not only an FC switch but also various other switches, such as an FCoE (Fibre Channel over Ethernet (registered trademark)) switch and an Ethernet (registered trademark) layer-2 switch.

Suppose, for example, that a switch temporarily stops a port when a server or the like that is connected to the switch is rebooted for a maintenance operation. After the reboot of the server or the like is completed, it starts a link-up process to link to the switch; however, because the port is stopped, the switch may not start the link-up process. Even if the server is rebooted as a purposive action, in other words, the reboot of the server is a normal action, the switch stops the port temporarily because it keeps receiving invalid signals.

Therefore, until a maintenance person disconnects and then reconnects the cable that is connected to the port from the switch, the switch may not start the link initialization process of linking the port to the server. As described above, in some cases, depending on the timing when a switch temporarily stops a port, the link initialization process may not start automatically; therefore, the link initialization process performed by such a switch may not be said to be stable. Moreover, with a large system having a plurality of servers, it is not practical for a maintenance person to disconnect and then reconnect cables to ports.

SUMMARY

According to an aspect of an embodiment of the invention, a switch includes a receiving unit that receives a connection-state change notice from an information processing apparatus, wherein the connection-state change notice indicates that a connection state is changed; a shifting unit that shifts, when the receiving unit receives a connection-state change notice, the state of the receiving unit to a process preventing state to prevent execution of a process that corresponds to a signal that is received from the information processing apparatus; and a releasing unit that releases the receiving unit from the process preventing state when the receiving unit receives, after receiving unit is shifted to the process preventing state by the shifting unit, a signal that satisfies a predetermined condition from the information processing apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table that contains examples of information stored in the state table;

FIG. 4 is a block diagram of the configuration of a server;

FIG. 5A is a diagram of a process sequence performed by the system according to the first embodiment;

FIG. 5B is a diagram of a process sequence performed by the system according to the first embodiment;

FIG. 6A is a flowchart of a process performed by the switch; and

FIG. 7 is a flowchart of a particular-signal determining process performed by the switch.

DESCRIPTION OF EMBODIMENTS

Preferred embodiments of the present invention will be explained with reference to accompanying drawings.

It should be noted that the present invention is not limited to the following embodiments.

[a] First Embodiment

In the first embodiment, the configuration of a system including a switch, the configuration of each device that forms the system, the processing flow, and the effects of the first embodiment are explained. The system configuration, etc., mentioned below is merely an example and it is not limited thereto.

System Configuration

Figure 1:
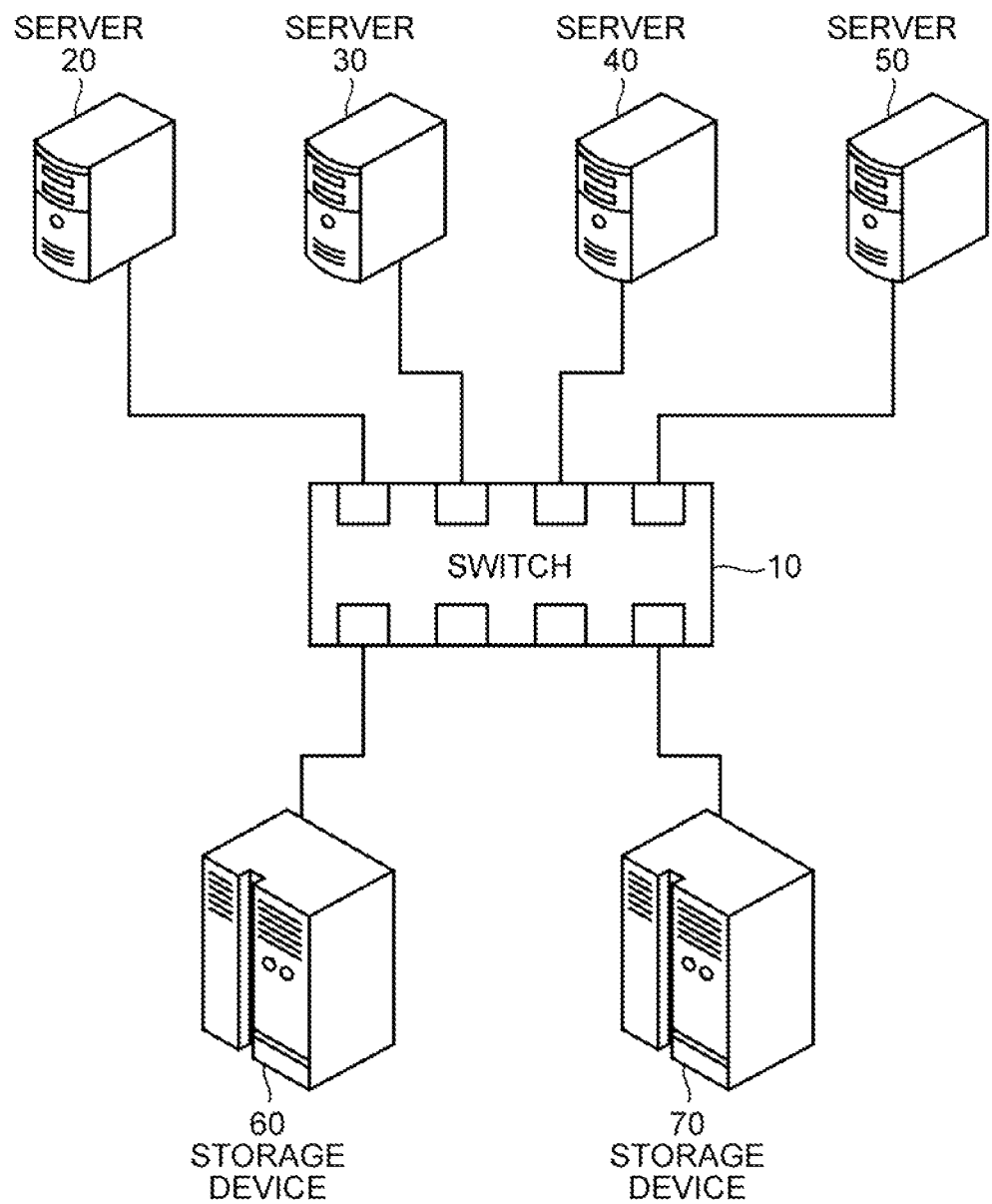
FIG. 1 is a schematic diagram of the configuration of a system according to the first embodiment.

FIG. 1 is a schematic diagram of the configuration of a system according to the first embodiment. As illustrated in FIG. 1, the system is a storage area network in which each of servers 20, 30, 40, and 50 is connected to storage devices 60 and 70 via a switch 10. The number of devices of the same type, the connection relation, etc., is merely an example and it is not limited thereto.

The servers 20, 30, 40, and 50 are service servers that perform various processes and provide services, etc., to clients. They are connected to the switch 10 via fibre channels. Each server reads data from the storage device 60 or the storage device 70 and stores data in the storage device 60 or the storage device 70.

The switch 10 is connected to each of the servers 20, 30, 40, and 50 via fibre channels and also connected to each of the storage devices 60 and 70 via fibre channels. For example, the switch 10 transmits a data read request that is received from the server 20 to the storage device 70 and transmits a data write request that is received from the server 50 to the storage device 60.

Although the example illustrated in FIG. 1 uses the switch 10, it is not limited thereto. Any switch can be used depending on the system configuration. For example, it is allowable to use, instead of the switch 10, various switches, such as a switch for Fibre Channel over Ethernet (FCoE) switch and a layer-2 switch that is used in a LAN (Local Area Network), etc.

The storage devices 60 and 70 have disk drives embedded therein that store therein data that is used for processes performed by the servers. The storage devices 60 and 70 identify a target disk drive in accordance with a request received from a server, such as a data read request or a write request, then perform a process, and then response a result to the server from which the request is received.

The switch 10, which is included in the abovementioned system, receives from a server or storage device a state change notice indicating that the connection state is changed. The switch 10 then shifts the state of a port that is connected to the server or storage device, from which the state change notice is received, to a process preventing state to prevent execution of a process that corresponds to a signal that is received from the server or storage device. After that, when the switch 10 receives a signal that satisfies a predetermined condition from the server or storage device, which is connected to the port that is in the process preventing state, the switch 10 releases the port from the process preventing state.

As described above, when the server or the like is rebooted for a maintenance operation, in other words, a stop of the server or the like is a purposive normal action, the switch 10 shifts the state of a port that is connected to the server or the like to the process preventing state. With this configuration, the switch 10 prevents a server that is in a normal stop state from being subjected to a link initialization process, such as processes of checking synchronization between signals and processes of tuning the transmission rate. When the switch 10 receives a signal that satisfies a predetermined condition from the server, the switch 10 shifts the state of the port, which is connected to the server, from the process preventing state to a normal state.

Therefore, when a server is in a normal stop state, the switch 10 prevents the link initialization process. When the server is then booted successfully, the switch 10 automatically performs the link initialization process. As described above, the switch 10 can perform a stable link initialization process without manual disconnecting of ports, etc.

Configuration of Device

The configuration of each device included in the system illustrated in FIG. 1 will be explained below. Each server illustrated in FIG. 1 has the same configuration and, therefore, in the following, details of the server 20 will be explained as an example. Each storage device has the same control unit as a control unit of the server 20 and, therefore, details of each storage device are not repeated. The control unit of the server 20 will be explained with reference to FIG. 4.

Configuration of Switch

Figure 2:
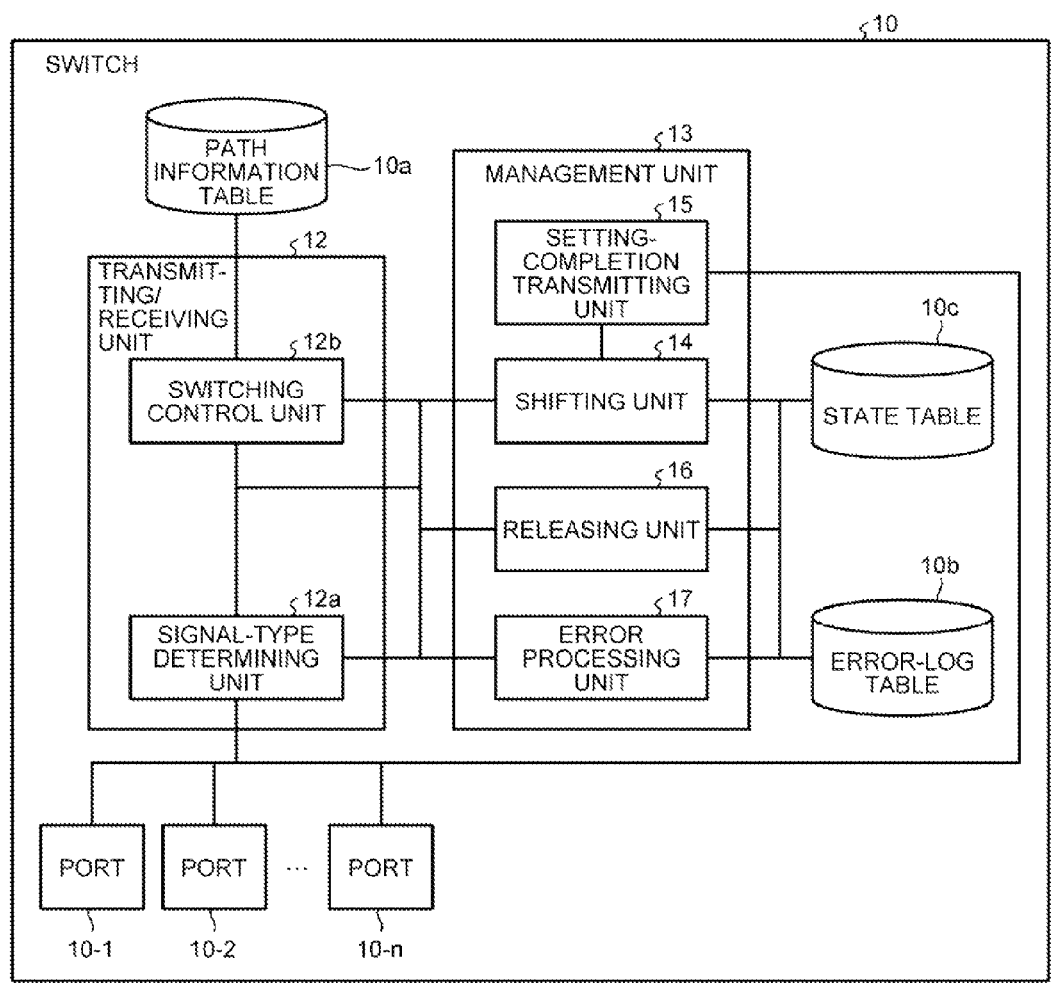
FIG. 2 is a block diagram of the configuration of the switch.

FIG. 2 is a block diagram of the configuration of the switch. As illustrated in FIG. 2, the switch 10 includes ports 10-1 to 10-n (n: natural number), a path information table 10a, an error-log table 10b, a state table 10c, a transmitting/receiving unit 12, and a management unit 13. The path information table 10a, the error-log table 10b, and the state table 10c are created in a storage device of a semiconductor memory element or a hard disk.

The ports 10-1 to 10-n are interfaces that connect the respective servers to the respective storage devices via fibre channels. The transmission rates of the ports 10-1 to 10-n are changeable and they are adjusted to the transmission rates of the respective devices that are connected thereto for communications. The ports 10-1 to 10-n receive a frame, an optical signal, a state change notice, etc., from the respective servers or storage devices and then output it to the transmitting/receiving unit 12. Moreover, the ports 10-1 to 10-n transmit a frame and a setting completion notice that is received from the transmitting/receiving unit 12 to a server or storage device that is the destination thereof.

The path information table 10a stores therein path information that contains, in an associated manner, an identifier that is used to identify a port and an identifier that is used to identify a device that is connected to the port. For example, the path information table 10a stores therein a port number and a media access control (MAC) address or an internet protocol (IP) address of a server in an associated manner.

The error-log table 10b stores therein error information, such as a link disconnection and a process abnormal completion, in associated with a date-and-time when the error occurred. Information stored in the error-log table 10b is stored by an error processing unit 17 or the like and the information is used for error analysis, etc.

The state table 10c stores therein conditions of specified signals that cause the respective ports to be released from the waiting-for-driver-start-up state. FIG. 3 is a table that contains examples of information stored in the state table. As illustrated in FIG. 3, the state table 10c stores therein "port No., transmission rate, ordered set, number of received signals, and flag" in an associated manner. The "port No." is a port number that is used to identify a port. The "transmission rate" is also called "transmission speed" and indicates an amount of information transmitted to a device that is connected to the port per a unit time.

The "ordered set" is 40-bit information that is made up of four pieces of 10-bit data. The ordered set is used to manage transmission of a frame and initialization and distinguish fibre-channel control information from data. For example, the "ordered set" forms information indicative of a link disconnection, an unavailable link, a link reset, etc. The "number of received signals" is the number of times receiving the "ordered set" continuously. The "flag" indicates the current state of the port. If, for example, the port is in the waiting-for-driver-start-up state, the flag is "on" and if the port is in a state prior to the waiting-for-driver-start-up state, the flag is "off".

The example of FIG. 3 indicates that the port 10-1, which has the port number A, is currently in the waiting-for-driver-start-up state and if consecutive 10 ordered sets (XXXX) are received at the transmission rate 4 Gbit/sec, the port is released from the waiting-for-driver-start-up state.

The transmitting/receiving unit 12 includes a signal-type determining unit 12a and a switching control unit 12b. By using the above units, the transmitting/receiving unit 12 transmits/receives a frame and an optical signal to/from the respective servers and the respective storage devices and processes a frame in various manners.

The signal-type determining unit 12a determines the type of information received from each port and sorts them to the switching control unit 12b and the management unit 13. For example, the signal-type determining unit 12a determines whether information received from a port is a frame or an optical signal depending on the data format, etc., of the received information. If the received information is a frame, the signal-type determining unit 12a outputs the frame to the switching control unit 12b. If the received information is an optical signal, the signal-type determining unit 12a outputs the optical signal to each of a shifting unit 14, a releasing unit 16, and the error processing unit 17.

The signal-type determining unit 12a receives a signal at a transmission rate specified by the later-described shifting unit 14. For example, when the signal-type determining unit 12a fixes the transmission rate to a specified rate and then receives, from a device that is connected thereto such as a server or a storage, a signal at a transmission rate that is different from the fixed transmission rate, the signal-type determining unit 12a transmits the received signal to the shifting unit 14. In this case, because the signal-type determining unit 12a does not receive a correct bit pattern that is expected by the shifting unit 14, a link is not built up.

On the other hand, when the signal-type determining unit 12a fixes the transmission rate to a specified rate and then receives, from a device that is connected thereto, a signal at the fixed transmission rate, the signal-type determining unit 12a transmits the received signal to the shifting unit 14. In this case, because the signal-type determining unit 12a receives a correct bit pattern expected by the shifting unit 14, a link is built up.

The switching control unit 12b is a control unit that performs switching operation for a received frame. For example, the switching control unit 12b performs switching operation for a frame that is received from the signal-type determining unit 12a and that is determined to be unprocessed by any of the shifting unit 14, the releasing unit 16, and the error processing unit 17. More particularly, the switching control unit 12b extracts a destination address from the header of a frame to be processed and then identifies a port number that corresponds to the extracted destination address by referring with the path information table 10a. The switching control unit 12b then transmits the frame via a port that has the identified port number.

The management unit 13 is an electric circuit, such as a CPU (Central Processing Unit and includes the shifting unit 14, a setting-completion transmitting unit 15, the releasing unit 16, and the error processing unit 17. The management unit 13 processes an optical signal received by each port in various manners by using the above units.

When a driver stop notice is received via a port from a device, the shifting unit 14 shifts the state of the port, which is connected to the device, to a waiting-for-driver-start-up state to prevent execution of a process that corresponds to a signal received from the device.

For example, the shifting unit 14 receives, from the signal-type determining unit 12a, not only the driver stop notice but also a frame that contains a parameter indicative of a connection environment to the port. The shifting unit 14 also receives, from the signal-type determining unit 12a, the port number of the port that receives the driver stop notice. The shifting unit 14 then extracts "the transmission rate, the ordered set, and the number of transmitted ordered sets" from the parameter included in the received frame.

Thereafter, the shifting unit 14 stores "the port number", which is received from the signal-type determining unit 12a, in the state table 10c in such a manner that the port number is assigned to "the extracted transmission rate, the extracted ordered set, and the extracted number of transmitted ordered sets". It is noted that the shifting unit 14 stores the extracted "number of transmitted ordered sets" in the state table 10c as the "number of received signals". When the shifting unit 14 stores conditions of specified signals in the state table 10c, the port is shifted to a stage prior to the waiting-for-driver-start-up state. Thereafter, the shifting unit 14 outputs a notice that the parameter, etc., is stored in the state table 10c and the port number that is assigned to the parameter to the setting-completion transmitting unit 15.

As described above, the shifting unit 14 stores a specified signal in accordance with the parameter that is received from a server whose driver is scheduled to be stopped. In other words, the shifting unit 14 receives a communication configuration that is used by the port having a variable transmission rate after a link is rebuilt and sets the communication configuration to be a condition to release the port from the waiting-for-driver-start-up state.

After that, when the shifting unit 14 detects a link disconnection of a port that is at the stage prior to the waiting-for-driver-start-up state, the "flag" is set "on" that is stored in the state table 10c and is assigned the port number of the port. For example, the shifting unit 14 determines whether a receiving port of an invalid optical signal that is received from the signal-type determining unit 12a is stored in the state table 10c. If the receiving port of an invalid optical signal is stored in the state table 10c and the "flag" that is assigned to the receiving port is "off", the shifting unit 14 detects that a link disconnection occurs at the port that is at the stage prior to the waiting-for-driver-start-up state. In other words, the shifting unit 14 determines that a purposive link disconnection occurs, i.e., a normal link disconnection occurs. The shifting unit 14 then sets the "flag" to "on" that is stored in the state table 10c and assigned to the port number of the receiving port.

As described above, when a link disconnection is detected at a port that is at the stage prior to the waiting-for-driver-start-up state, the shifting unit 14 changes the transmission rate of the port to a speed (transmission rate) that is specified by the driver of the server 20 and changes the state of the port to the waiting-for-driver-start-up state. Moreover, when a port is shifted to the driver stand-by state, the shifting unit 14 transmits an instruction to the signal-type determining unit 12a to receive a signal, if it is received via the port, at the transmission rate that is stored in the state table 10c. If an optical signal received via a port that is at the stage prior to the waiting-for-driver-start-up state is disconnected, if the port receives an invalid optical signal, or if the port does not receive an idle signal, the shifting unit 14 detects a link disconnection.

When a predetermined signal is received via a port that is in the waiting-for-driver-start-up state, the shifting unit 14 shifts the port from the waiting-for-driver-start-up state to a normal state. For example, the shifting unit 14 receives, from the signal-type determining unit 12a, a signal at the fixed transmission rate via a port that is in the waiting-for-driver-start-up state. Subsequently, the shifting unit 14 extracts an ordered set and a port number from the signal. The shifting unit 14 then identifies an ordered set that is in the state table 10c and that is assigned to the extracted port number. The shifting unit 14 then determines whether the ordered set that is extracted from the signal is the same as the identified ordered set. If the both ordered sets are the same, the shifting unit 14 determines that an expected signal is received, i.e., a correct link-up demanding signal is received.

After that, if a predetermined number of consecutive ordered sets that are the same as the ordered set stored in the state table 10c are received, the shifting unit 14 detects that the state of the port has been returned from the waiting-for-driver-start-up state. After that, the shifting unit 14 sets the flag of the port that is stored in the state table 10c to "off" and then instructs the releasing unit 16 to start a link-up. When the shifting unit 14 receives a notice of a successful link-up from the releasing unit 16, the shifting unit 14 deletes the table of the port from the state table 10c.

In the example of FIG. 3, when the "port 10-1" having the port number A receives "10" consecutive ordered sets "XXXX" at a transmission rate "4 Gbit/sec", the shifting unit 14 shifts the state of the "port 10-1" from the waiting-for-driver-start-up state to the normal state.

Referring back to FIG. 2, the setting-completion transmitting unit 15 transmits, to the device from which the driver stop notice is received, a completion notice indicating that the predetermined condition has been determined by the shifting unit 14 in accordance with a parameter. For example, when the setting-completion transmitting unit 15 receives a notice indicating that setting of the state table 10c is completed and the port number from the shifting unit 14, the setting-completion transmitting unit 15 transmits a setting completion notice via a port that has the received port number.

The releasing unit 16 performs a link initialization process, thereby linking up a port after the shifting unit 14 shifts the port from the waiting-for-driver-start-up state to the normal state.

For example, the releasing unit 16 performs the link initialization process that includes a tuning process of tuning the transmission rate of the server to the transmission rate of a port that is shifted from the waiting-for-driver-start-up state to the normal state and a checking process of checking synchronization between signals, thereby connecting a link. After that, the releasing unit 16 transmits a notice indicating that a link is built up successfully to the shifting unit 14. With this configuration, the releasing unit 16 sets a port that is in the waiting-for-driver-start-up state back to the normal state in accordance with the after-link-rebuilt communication configuration that is specified by the server.

Referring back to FIG. 2, when an error is detected, such as a link disconnection or an abnormal process end, the error processing unit 17 performs an error recovery process and stores an error log in the error-log table 10b. For example, the error processing unit 17 determines whether a receiving port of an invalid optical signal that is received from the signal-type determining unit 12a is stored in the state table 10c and the "flag" is "on". If the receiving port that receives an invalid optical signal is stored in the state table 10c and the "flag" is "on", the error processing unit 17 ignores the invalid optical signal and performs no error processing. In other words, in the above case, the error processing unit 17 does not store an error log and does not perform a link rebuilding process.

On the other hand, if the receiving port that receives an invalid optical signal is not stored in the state table 10c or if the receiving port is stored and the "flag" is "off", the error processing unit 17 determines that an unpurposive link disconnection, i.e., an error occurs. In the above case, the error processing unit 17 performs a tuning process of tuning the transmission rate of the receiving port that receives the invalid signal to the transmission rate of the server from which the invalid signal is received and a checking process of checking synchronization between signals, thereby performing the link rebuilding, repeatedly. As long as invalid signals are being detected, the error processing unit 17 stores error information or a failure of link connection in the error-log table 10b as an error log.

Configuration of Server

FIG. 4 is a block diagram of the configuration of a server. As illustrated in FIG. 4, the server 20 includes an adapter card 21, a setting information table 22, and a control unit 23. The setting information table 22 is created in a storage device, such as a semiconductor memory element and a hard disk.

The adapter card 21 is an interface that is connected to the switch 10 via a fibre channel. The adapter card 21 transmits an optical signal to the switch 10 and transmits/receives a frame that contains data to/from the switch 10. The adapter card 21 is transmitting optical signals to the switch 10 so long as the server 20 is powered.

The setting information table 22 stores therein information that is set for the adapter card 21, and the setting information table 22 is updated or deleted by an administrator, etc. For example, the setting information table 22 stores therein "an ON instruction flag of the waiting-for-driver-start-up state, a transmission rate at the waiting-for-driver-start-up state, an ordered set for the waiting-for-driver-start-up state, and the number of transmitted ordered sets". If the server 20 has a plurality of adapter cards 21, the above information is stored based on each of the adapter cards 21.

The stored "ON instruction flag of the waiting-for-driver-start-up state" is information indicative of an instruction to shift the state to the waiting-for-driver-start-up state. An "ON instruction flag of the waiting-for-driver-start-up state" is transmitted to shift the state to the waiting-for-driver-start-up state in such a manner that it is included in a driver stop notice. The "transmission rate at the waiting-for-driver-start-up state, the ordered set for the waiting-for-driver-start-up state, and the number of transmitted ordered sets" are the same as those explained as the configuration of the switch 10 and, therefore, the details are not repeated.

The control unit 23 is an electric circuit, such as a CPU, having an internal memory that stores therein control programs, such as an OS (Operating System) control program, programs that define various processing procedures, and data. The control unit 23 includes a process control unit 24 and an adapter driver 25. The control unit 23 performs various processes by using the above units.

When an OS reboot instruction is received from a user, the process control unit 24 transmits a stop instruction to a driver control unit 25a to stop the adapter driver 25. Thereafter, when a notice indicating that the adapter driver 25 has been stopped is received from the driver control unit 25a, the process control unit 24 stops the OS running on the control unit 23. When the OS is booted, the process control unit 24 transmits a start-up instruction to the driver control unit 25a to start up the adapter driver 25.

The adapter driver 25 is software or the like that controls operation of the adapter card 21 and it includes the driver control unit 25a and an information transmitting unit 25b. Upon receiving a stop instruction from the control unit 23 to stop the adapter driver 25, the driver control unit 25a transmits a parameter transmitting instruction to the information transmitting unit 25b. After that, when the adapter card 21 receives a notice indicating that setting of the transmitted parameter is completed from the switch 10, the driver control unit 25a stops the adapter driver 25 and transmits a notice indicative of the stop to the process control unit 24. The driver control unit 25a starts up the adapter driver 25 in response to an instruction received from the control unit 23 and transmits a notice indicative of the start-up of the adapter driver 25 to the information transmitting unit 25b.

Upon receiving a parameter transmitting instruction from the driver control unit 25a, the information transmitting unit 25b extracts information that is to be stored in the setting information table 22 in associated with the adapter card 21 specified by the driver control unit 25a. More particularly, the information transmitting unit 25b extracts "an ON instruction flag of the waiting-for-driver-start-up state, a transmission rate at the waiting-for-driver-start-up state, an ordered set for the waiting-for-driver-start-up state, and the number of transmitted ordered sets". The information transmitting unit 25b then creates a driver stop notice that contains the extracted information and transmits the driver stop notice via the adapter card 21.

Upon receiving a notice indicative of a start-up of the adapter driver 25 from the driver control unit 25a, the information transmitting unit 25b transmits a specified signal in accordance with information that is stored in the setting information table 22. More particularly, the information transmitting unit 25b transmits a predetermined "number" of consecutive predetermined "ordered sets" at a predetermined "transmission rate" to the switch 10 by referring to the setting information table 22.

As described above, before the adapter driver 25 is stopped, the server 20 transmits the after-start-up communication configuration of the adapter card 21 to the switch 10. Therefore, if an optical signal that satisfies the notified communication configuration is received, the switch 10 detects that the server 20 is rebooted successfully.

Flow of Process

A process performed by the system illustrated in FIG. 1 will be explained below with reference to FIGS. 5A to 7.

A process sequence performed by the system will be explained with reference to FIG. 5A and 5B; a process performed by the switch will be explained with reference to FIG. 6A and 6B, and a particular-signal determining process performed by the switch will be explained with reference to FIG. 7. In the following example, the switch 10 and the server 20 are used.

Process Sequence

FIG. 5A is a diagram of a process sequence performed by the system according to the first embodiment. FIG. 5B is a diagram of a process sequence performed by the system according to the first embodiment. As illustrated in FIG. 5A, upon receiving an OS stop instruction from an administrator (S101), the process control unit 24 of the server 20 outputs a stop instruction to the driver control unit 25a of the adapter driver 25 to stop the adapter driver 25 (S102). The process control unit 24 receives an OS stop instruction via an input device, such as a keyboard, or receives an OS stop instruction via a network by a remote operation or the like.

Upon receiving the driver stop instruction, the driver control unit 25a instructs the information transmitting unit 25b to transmit information and the information transmitting unit 25b transmits both a parameter that is stored in the setting information table 22 and a driver stop notice to the switch 10 (S103).

The transmitting/receiving unit 12 of the switch 10 receives the parameter and the driver stop notice from the server 20 (S104). The shifting unit 14 then stores the parameter that is received from the server 20 in the state table in such a manner that the parameter is assigned to a port that receives the driver stop notice (S105). After that, when the parameter is stored in the setting information table 22 by the shifting unit 14, the setting-completion transmitting unit 15 transmits a setting completion notice to the server 20 (S106).

When the adapter card 21 receives the setting completion notice, the driver control unit 25a of the server 20 stops the adapter driver 25 (S107). Upon receiving a notice indicative of the stop of the adapter driver 25 from the driver control unit 25a, the process control unit 24 then stops the OS (S108). After that, because the OS of the server 20 is stopped but the server 20 is powered, the adapter card 21 transmits invalid optical signals to the switch 10, repeatedly until the OS is booted (S109).

On the other hand, when the shifting unit 14 of the switch 10 detects a link disconnection of a port with a parameter being set, i.e., a link disconnection of the server 20 after the receiving of the driver stop notice (S110), the shifting unit 14 shifts the port to the waiting-for-driver-start-up state (S111). After that, as illustrated in FIG. 5B, the error processing unit 17 of the switch 10 prevents execution of an error process, etc., even when the port, which is in the waiting-for-driver-start-up state, receives an invalid signal (S112).

As described above, when Steps S101 to S112 are performed, although the server 20 periodically transmits an invalid signal to the switch 10, the error processing unit 17 of the switch 10 ignores any signals received from the server 20 other than specified signals.

Under the above situation, when the OS is booted in response to an instruction received from the administrator (S113), the process control unit 24 of the server 20 outputs a start-up instruction to the driver control unit 25a of the adapter driver 25 to start up the adapter driver 25 (S114).

After that, when the driver control unit 25a starts up the adapter driver 25, the information transmitting unit 25b transmits a specified signal to the switch 10 in accordance with information that is stored in the setting information table 22 (S115). More particularly, the information transmitting unit 25b transmits, to the switch 10, a predetermined number of consecutive predetermined ordered sets at a predetermined transmission rate by referring to the setting information table 22.

Upon receiving a specified signal from the server 20, which is connected to the port that is in the waiting-for-driver-start-up state (S116), the shifting unit 14 of the switch 10 releases the port from the waiting-for-driver-start-up state and shifts the port to the normal state (S117).

Subsequently, when the state of the port is back to the normal state, the releasing unit 16 sets the transmission rate of the port back to a before-waiting-for-driver-start-up-state value and starts the link initialization process (S118). After that, a link is connected between the port of the switch 10 and the adapter card 21 of the server 20 and the process control goes to end (S119 and S120).

Flow of Process Performed by Switch

Figure 6B:
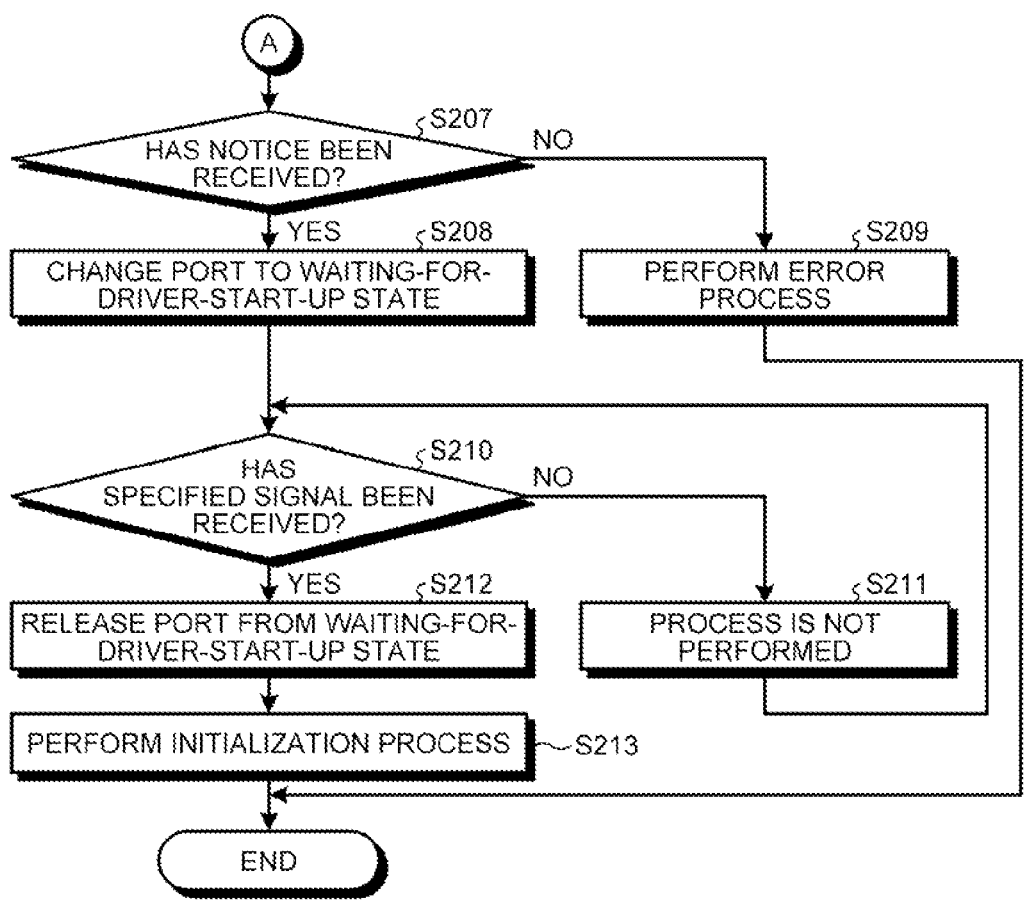
FIG. 6B is a flowchart of a process performed by the switch.

FIG. 6A is a flowchart of a process performed by the switch. FIG. 6B is a flowchart of a process performed by the switch. As illustrated in FIG. 6A, upon receiving both a driver stop notice and a parameter from the server 20 (Yes at S201), the shifting unit 14 of the switch 10 stores the received parameter in the state table 10c and sets the parameter (S202).

Subsequently, the shifting unit 14 sets the "flag" of the parameter that is stored in the state table 10c to "off" and the preparation for the waiting-for-driver-start-up state is completed (S203). The setting-completion transmitting unit 15 then transmits the setting completion notice to the server 20 (S204).

After that, when the switch 10 detects a link disconnection (Yes at S205), the shifting unit 14 or the error processing unit 17 identifies a link-disconnected port (S206). Subsequently, as illustrated in FIG. 6B, the shifting unit 14 or the error processing unit 17 determines whether the port receives a driver stop notice (S207). In other words, the shifting unit 14 or the error processing unit 17 determines whether a parameter assigned to the link-disconnected port is present in the state table 10c.

If the port receives a driver stop notice (Yes at S207), the shifting unit 14 changes the state of the port to the waiting-for-driver-start-up state (S208). More particularly, the shifting unit 14 sets the "flag" of the parameter, which is stored in the state table 10c and is assigned to the port, to "on".

On the other hand, if the port receives no driver stop notice (No at S207), the error processing unit 17 determines that the occurred link disconnection is an error and performs the error process (S209).

After that, each time when a signal or a frame is received by a state-shifted port, the shifting unit 14 determines whether a specified signal is received (S210). If the signal or the like received by the shifting unit 14 is not a specified signal (No at S210), the error processing unit 17 does not perform any error process in response to the received signal and ignores the signal (S211). After that, the process control returns to S210 and the switch 10 determines whether the signal is a specified signal.

On the other hand, if the received signal or the like is a specified signal (Yes at S210), the shifting unit 14 releases the port from the waiting-for-driver-start-up state and sets the port back to the normal state (S212). After that, the releasing unit 16 performs the link initialization process to link up the port, which is shifted from the waiting-for-driver-start-up state to the normal state (S213).

Flow of Particular-signal Determining Process

An example of the particular-signal determining process performed by the switch 10 will be explained with reference to FIG. 7. FIG. 7 is a flowchart of the particular-signal determining process performed by the switch.

As illustrated in FIG. 7, the signal-type determining unit 12a of the switch 10 receives a signal from a port that is in the waiting-for-driver-start-up state (S301). Subsequently, the shifting unit 14 determines whether the received signal is a specified signal (S302). If the received signal is a specified signal (Yes at S302), the shifting unit 14 counts received consecutive signals and determines whether the count reaches a predetermined count (S303). If a predetermined number of consecutive specified signals is received (Yes at S303), the shifting unit 14 then shifts the port from the waiting-for-driver-start-up state to the normal state.

For example, the shifting unit 14 sets a transmission rate of the port, which is in the waiting-for-driver-start-up state. If a signal is received at the set transmission rate and the sequence of the signal is the same as a predetermined sequence, the shifting unit 14 then determines that a specified signal is received. After that, if the predetermined number of consecutive specified signals is received, the shifting unit 14 shifts the port from the waiting-for-driver-start-up state to the normal state.

Effects of First Embodiment

As described above, the switch 10 ignores any signals that are received from a server that is in a normal stop other than specified signals and then, when the server is booted successfully and specified signals are received from the server, the switch 10 performs the link initialization process. In contrast, each time when a signal is received from a server that is in an abnormal stop, the switch 10 performs an error-log storing process, a checking process, etc., thereby performing an error-information recording process and a link-connection rebuilding process. As described above, when either a normal stop or an abnormal stop occurs, the switch 10 can rebuild a link connection in a manner appropriate for the situation, i.e., the switch 10 can perform the link initialization process in a stable manner.

Moreover, even when an invalid signal is received from a server that is in a normal stop, the switch 10 does not perform the error process, etc.; therefore, the processing load on the CPU is reduced and shortage of resources is prevented. Even when an invalid signal is received from a server that is in a normal stop, the switch 10 does not perform error-log storing, either. Because no other information than actual errors are stored as error logs, more accurate and quicker defect analysis will be made.

[b] Second Embodiment

An embodiment of the present invention is explained above; however, the present invention can be embodied variously. Some other embodiments will be explained below.

Application to Software

Although, in an example of the first embodiment, an adapter driver stops in association with an OS stop, the configuration is not limited thereto. For example, any software can be used even if it is called another name so long as it controls an interface that makes a link connection to the switch 10.

Driver Stop Notice and Parameter

Although, in an example of the first embodiment, the server 20 transmits both a driver stop notice and a parameter to the switch 10 and the switch 10 determines what the specified signal is in accordance with the parameter, the configuration is not limited thereto. If, for example, a communications protocol is set in advance between a port of the switch 10 and the adapter card 21 of the server 20, it is allowable to store the communications protocol in the state table 10c of the switch 10 as a particular condition.

Because the server 20 does not need to transmit a parameter to the switch 10, leakage of the parameter is prevented. The protocol can be a combination of any conditions explained in the first embodiment or any one of conditions. Moreover, it is allowable to set any data mutually agreed to be a specified signal, i.e., any signal agreed between the server 20 and the switch 10 can be a specified signal.

System

Of the processes described in the embodiments, all or part of the processes explained as being performed automatically can be performed manually. Similarly, all or part of the processes explained as being performed manually can be performed automatically by a known method. The processing procedures, the control procedures, specific names, various data, and information including parameters described in the embodiments or illustrated in the drawings, for example, FIG. 3 can be changed unless otherwise specified.

The constituent elements of the device illustrated in the drawings are merely conceptual, and need not be physically configured as illustrated. For example, the shifting unit 14 and the releasing unit 16 can be integrated together. The manner of separating/integrating the devices is not limited to the manner as illustrated. The constituent elements, as a whole or in part, can be separated or integrated based on an arbitrary unit either functionally or physically in accordance with various types of loads or use conditions. Moreover, the process functions performed by the device are entirely or partially realized by a CPU or computer programs that are analyzed and executed by the CPU, or realized as hardware by wired logic.

The processes of the functional units explained in the above embodiments can be performed when a computer, such as a personal computer or a work station, executes a predetermined program. The program can be delivered via a network, such as the Internet. The program can be stored in a computer-readable recording medium, such as a hard disk, a flexible disk (FD), a CD-ROM, an MO, and a DVD. A computer reads the program from the recording medium and executes the read computer program.

For example, the switch 10 stores a port control program that is used to control the shifting unit 14, the setting-completion transmitting unit 15, the releasing unit 16, and the error processing unit 17 in a ROM (Read Only Memory), reads it from the ROM, and then executes it by using a CPU or the like. Thereafter, the switch 10 performs the port control process, thereby executing operations in the same manner as the shifting unit 14, the setting-completion transmitting unit 15, the releasing unit 16, and the error processing unit 17.

According to an aspect of the switch, the information processing apparatus, and the information processing system of the present invention, the link initialization process is performed stably.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch comprising:
    a receiver that includes a port having a variable transmission rate, that receives a connection-state change notice indicating that a connection state is changed from an information processing apparatus whose driver is scheduled to be stopped, and that receives an instruction specifying a transmission rate to be used by the port after a link which is disconnected by stopping of the driver is rebuild; and
    a processor to execute a procedure, the procedure including:
    shifting, when the receiver receives a connection-state change notice, the state of the receiver to a process preventing state to prevent execution of a process that corresponds to a signal that is received from the information processing apparatus;
    setting the transmission rate of the port according to the instruction received by the receiver; and
    releasing, when a bit pattern which is specified preliminarily in order to indicate a linkup is received through the port of the receiver in the process preventing state using the transmission rate, the receiver from the process preventing state.

2. The switch according to claim 1, wherein
    the receiver receives not only the connection-state change notice but also a parameter indicative of a connection environment that is set between the information processing apparatus and the receiver,
    when the receiver receives the connection-state change notice and the parameter, the shifting includes acquiring the transmission rate that is included in the received parameter, and
    the setting includes setting the transmission rate acquired at the acquiring to the port.

3. The switch according to claim 2 further comprising transmitting a completion notice to the information processing apparatus, the completion notice indicating that the transmission rate is acquired at the shifting, wherein
    when a link between the information processing apparatus and the receiver is disconnected after a completion notice is transmitted at the transmitting, the shifting includes shifting the receiver to the process preventing state.

4. The switch according to claim 2, wherein the releasing includes releasing the receiver from the process preventing state when a predetermined number of consecutive signals bit patterns are received through the port of the receiver in the process preventing state using the transmission rate.

5. The switch according to claim 2, wherein the releasing includes releasing the receiver from the process preventing state when a predetermined number of consecutive predetermined ordered sets are received through the port of the receiver in the process preventing state using the transmission rate.

6. The switch according to claim 1, wherein the shifting includes shifting the state of the receiver to a preparatory state for the process preventing state when the receiver receives the connection-state change notice and shifting the state of the receiver from the preparatory state to the process preventing state when a disconnection of a link that connects the switch and the information processing apparatus is detected after the state of the receiver is shifted to the preparatory state.

7. An information processing apparatus comprising:
    a transmitter that transmits a connection-state change notice indicating that the connection state of the information processing apparatus is changed to a switch that is connected to the information processing apparatus,
    a receiver that receives a setting completion notice from the switch as a response to the connection-state change notice; and
    a processor to execute a procedure including setting, when the setting completion notice is received, the transmitter and the receiver to a stand-by state, wherein
    the transmitter transmits, to the switch, an instruction specifying a transmission rate to be used by a port of the switch having a variable transmission rate after a link which is disconnected by stopping of a driver which is scheduled to be stopped is rebuild and transmits, when the transmitter and the receiver are returned from the stand-by state, a bit pattern which is specified preliminarily in order to indicate a linkup to the switch using the transmission rate.

8. The information processing apparatus according to claim 7, wherein the transmitter transmits not only the connection-state change notice but also a parameter including the transmission rate indicative of a connection environment that is used for a communication that is made with the switch.

9. An information processing system in which an information processing apparatus is connected to another device via a switch, wherein
    the information processing apparatus includes
    a transmitter that transmits a connection-state change notice indicating that the connection state of the information processing apparatus is changed to the switch;

a receiver that receives a setting completion notice from the switch as a response to the connection-state change notice; and a processor to execute a procedure including setting, when the setting completion notice is received, the transmitter and the receiver to a stand-by state; wherein the transmitter transmits, to the switch, an instruction specifying a transmission rate to be used by a port of the switch having a variable transmission rate after a link which is disconnected by stopping of a driver which is scheduled to be stopped is rebuild and transmits, when the transmitter and the receiver are returned from the stand-by state, a bit pattern which is specified preliminarily in order to indicate a linkup to the switch using the transmission rate, and the switch includes a receiver that includes a port having a variable transmission rate, that receives the connection-state change notice from the information processing apparatus including the driver, and that receives the instruction specifying the transmission rate from the information processing apparatus; and a processor to execute a procedure, the procedure including:

shifting, when the receiver receives the connection-state change notice, the state of the receiver to a process preventing state to prevent execution of a process that corresponds to a signal that is received from the information processing apparatus;

setting the transmission rate of the port according to the instruction received by the receiver; and releasing, when the bit pattern is received through the port of the receiver in the process preventing state using the transmission rate, the state of the receiver from the process preventing state.

\* \* \* \* \*